(12) United States Patent
Lv et al.

(10) Patent No.: US 10,795,822 B2
(45) Date of Patent: Oct. 6, 2020

(54) SYSTEM AND METHOD FOR NEGATIVE FEEDBACK CACHE DATA FLUSH IN PRIMARY STORAGE SYSTEMS

(71) Applicant: EMC IP Holding Company, LLC, Hopkinton, MA (US)

(72) Inventors: Shuo Lv, Beijing (CN); Wenjun Wang, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 122 days.

(21) Appl. No.: 16/007,240

(22) Filed: Jun. 13, 2018

(65) Prior Publication Data
US 2019/0034346 A1 Jan. 31, 2019

(30) Foreign Application Priority Data

Jul. 31, 2017 (CN) .......................... 2017 1 0637878

(51) Int. Cl.
*G06F 12/00* (2006.01)
*G06F 12/0888* (2016.01)
*G06F 12/0804* (2016.01)

(52) U.S. Cl.
CPC ...... *G06F 12/0888* (2013.01); *G06F 12/0804* (2013.01); *G06F 2201/81* (2013.01); *G06F 2212/21* (2013.01); *G06F 2212/281* (2013.01); *G06F 2212/603* (2013.01)

(58) Field of Classification Search
None
See application file for complete search history.

(56) References Cited

U.S. PATENT DOCUMENTS 8,402,226 B1 * 3/2013 Faibish .............. G06F 12/0804
711/143

FOREIGN PATENT DOCUMENTS

CN 107832118 A * 3/2018

* cited by examiner

*Primary Examiner* — Midys Rojas
(74) *Attorney, Agent, or Firm* — Brian J. Colandreo; Mark H. Whittenberger; Holland & Knight LLP

(57) ABSTRACT

A method, computer program product, and computer system for determining, by a computing device, a number of dirty pages capable of being generated per process on a backing device. It may be determined whether the number of dirty pages capable of being generated per process on the backing device exceeds a threshold set point of actual dirty pages currently generated per process on the backing device. A variable amount of time to sleep may be determined. Sleep may be executed for the variable amount of time, wherein generation of additional dirty pages is paused.

20 Claims, 10 Drawing Sheets

SYSTEM AND METHOD FOR NEGATIVE FEEDBACK CACHE DATA FLUSH IN PRIMARY STORAGE SYSTEMS

RELATED CASES

The subject application claims the priority of China Patent Application No. 201710637878.X, filed on 31 Jul. 2017, the contents of which are herein incorporated by reference in its entirety.

BACKGROUND

"Write back" may generally be described as the process of writing dirty pages back to persistent storage, allowing those pages to be reclaimed for other uses. When I/O pressure is too large, techniques to remedy this pressure may be implemented.

BRIEF SUMMARY OF DISCLOSURE

In one example implementation, a method, performed by one or more computing devices, may include but is not limited to determining, by a computing device, a number of dirty pages capable of being generated per process on a backing device. It may be determined whether the number of dirty pages capable of being generated per process on the backing device exceeds a threshold set point of actual dirty pages currently generated per process on the backing device. A variable amount of time to sleep may be determined. Sleep may be executed for the variable amount of time, wherein generation of additional dirty pages is paused.

One or more of the following example features may be included. Determining whether the number of dirty pages capable of being generated per process exceeds the threshold set point of the actual dirty pages being generated per process on the backing device may include identifying the actual dirty pages currently generated per process on the backing device relative to the threshold set point. Determining whether the number of dirty pages capable of being generated per process exceeds the threshold set point of the actual dirty pages being generated per process on the backing device may further include identifying the actual dirty pages currently generated per process relative to a hard limit of dirty pages on the backing device. Determining whether the number of dirty pages capable of being generated per process exceeds the threshold set point of the actual dirty pages being generated per process on the backing device may further include determining a global ratio based upon, at least in part, the actual dirty pages currently generated per process relative to the threshold set point and the actual dirty pages currently generated per process relative to the hard limit of dirty pages. The global ratio may be adjusted up if the backing device is over a respective share of dirty pages and the global ratio may be adjusted down if the backing device is under the respective share of dirty pages. The variable amount of time to sleep may be determined dynamically. The variable amount of time to sleep may be determined based upon, at least in part, a write back bandwidth capability of the backing device and a dynamic water level regulation of the number of dirty pages capable of being generated per process.

In another example implementation, a computing system may include one or more processors and one or more memories configured to perform operations that may include but are not limited to determining a number of dirty pages capable of being generated per process on a backing device. It may be determined whether the number of dirty pages capable of being generated per process on the backing device exceeds a threshold set point of actual dirty pages currently generated per process on the backing device. A variable amount of time to sleep may be determined. Sleep may be executed for the variable amount of time, wherein generation of additional dirty pages is paused.

One or more of the following example features may be included. Determining whether the number of dirty pages capable of being generated per process exceeds the threshold set point of the actual dirty pages being generated per process on the backing device may include identifying the actual dirty pages currently generated per process on the backing device relative to the threshold set point. Determining whether the number of dirty pages capable of being generated per process exceeds the threshold set point of the actual dirty pages being generated per process on the backing device may further include determining a global ratio based upon, at least in part, the actual dirty pages currently generated per process relative to the threshold set point and the actual dirty pages currently generated per process relative to the hard limit of dirty pages. The global ratio may be adjusted up if the backing device is over a respective share of dirty pages and the global ratio may be adjusted down if the backing device is under the respective share of dirty pages. The variable amount of time to sleep may be determined dynamically. The variable amount of time to sleep may be determined based upon, at least in part, a write back bandwidth capability of the backing device and a dynamic water level regulation of the number of dirty pages capable of being generated per process.

In another example implementation, a computer program product may reside on a computer readable storage medium having a plurality of instructions stored thereon which, when executed across one or more processors, may cause at least a portion of the one or more processors to perform operations that may include but are not limited to determining a number of dirty pages capable of being generated per process on a backing device. It may be determined whether the number of dirty pages capable of being generated per process on the backing device exceeds a threshold set point of actual dirty pages currently generated per process on the backing device. A variable amount of time to sleep may be determined. Sleep may be executed for the variable amount of time, wherein generation of additional dirty pages is paused.

One or more of the following example features may be included. Determining whether the number of dirty pages capable of being generated per process exceeds the threshold set point of the actual dirty pages being generated per process on the backing device may include identifying the actual dirty pages currently generated per process on the backing device relative to the threshold set point. Determining whether the number of dirty pages capable of being generated per process exceeds the threshold set point of the actual dirty pages being generated per process on the backing device may further include identifying the actual dirty pages currently generated per process relative to a hard limit of dirty pages on the backing device. Determining whether the number of dirty pages capable of being generated per process exceeds the threshold set point of the actual dirty pages being generated per process on the backing device may further include determining a global ratio based upon, at least in part, the actual dirty pages currently generated per process relative to the threshold set point and the actual dirty pages currently generated per process relative to the hard limit of dirty pages. The global ratio may be adjusted up if the backing device is over a respective share of dirty pages and the global ratio may be adjusted down if the backing device is under the respective share of dirty pages. The variable amount of time to sleep may be determined dynamically. The variable amount of time to sleep may be determined based upon, at least in part, a write back bandwidth capability of the backing device and a dynamic water level regulation of the number of dirty pages capable of being generated per process.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
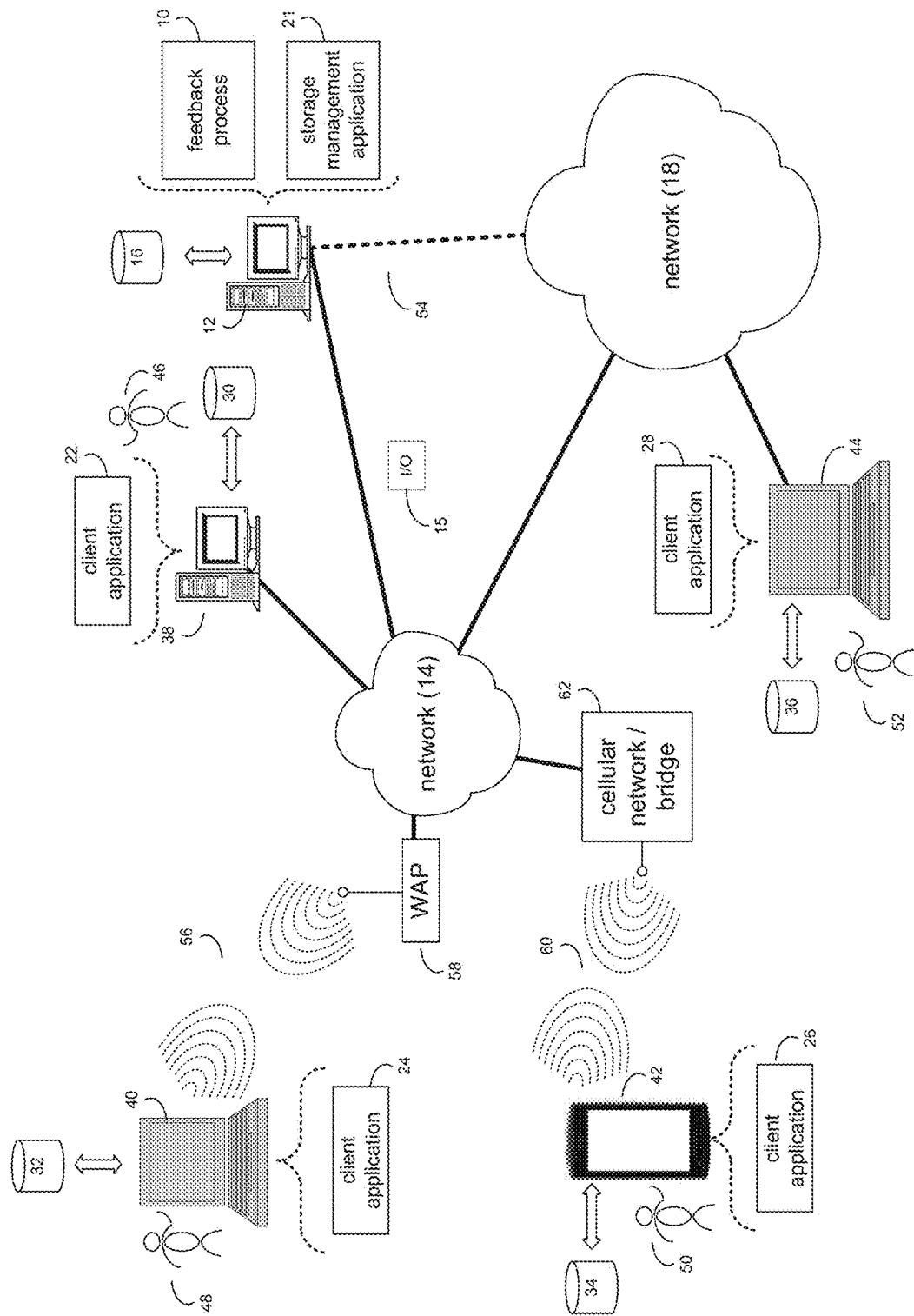
FIG. 1 is an example diagrammatic view of a feedback process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown feedback process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an feedback process, such as feedback process 10 of FIG. 1, may select, by a computing device, a first disk extent for each RAID extent in an extent pool. Remaining disk extents for each RAID extent in the extent pool may be selected.

In some implementations, the instruction sets and sub-routines of feedback process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, feedback process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, feedback process 10 and/or storage management application 21 may be accessed via one or more of client applications 22, 24, 26, 28. In some implementations, feedback process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within feedback process 10, a component of feedback process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of feedback process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of feedback process 10 (and vice versa). Accordingly, in some implementations, feedback process 10 may be a purely server-side application, a purely client-side application, or a hybrid server-side/client-side application that is cooperatively executed by one or more of client applications 22, 24, 26, 28 and/or feedback process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, feedback process 10, and storage management application 21, taken singly or in any combination, may effectuate some or all of the same functionality, any description of effectuating such functionality via one or more of client applications 22, 24, 26, 28, feedback process 10, storage management application 21, or combination thereof, and any described interaction(s) between one or more of client applications 22, 24, 26, 28, feedback process 10, storage management application 21, or combination thereof to effectuate such functionality, should be taken as an example only and not to limit the scope of the disclosure.

In some implementations, one or more of users 46, 48, 50, 52 may access computer 12 and feedback process 10 (e.g., using one or more of client electronic devices 38, 40, 42, 44) directly through network 14 or through secondary network 18. Further, computer 12 may be connected to network 14 through secondary network 18, as illustrated with phantom link line 54. Feedback process 10 may include one or more user interfaces, such as browsers and textual or graphical user interfaces, through which users 46, 48, 50, 52 may access feedback process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
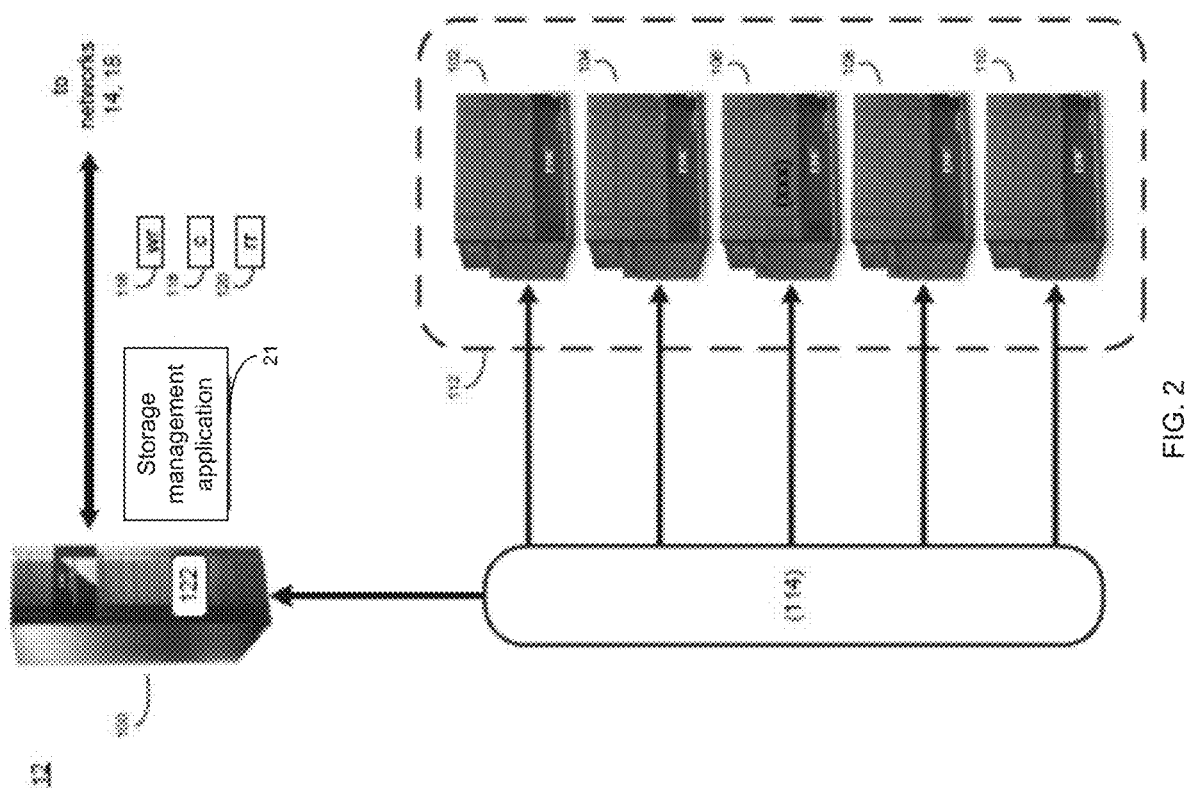
FIG. 2 is an example diagrammatic view of a computer of FIG. 1 according to one or more example implementations of the disclosure.
Figure 3:
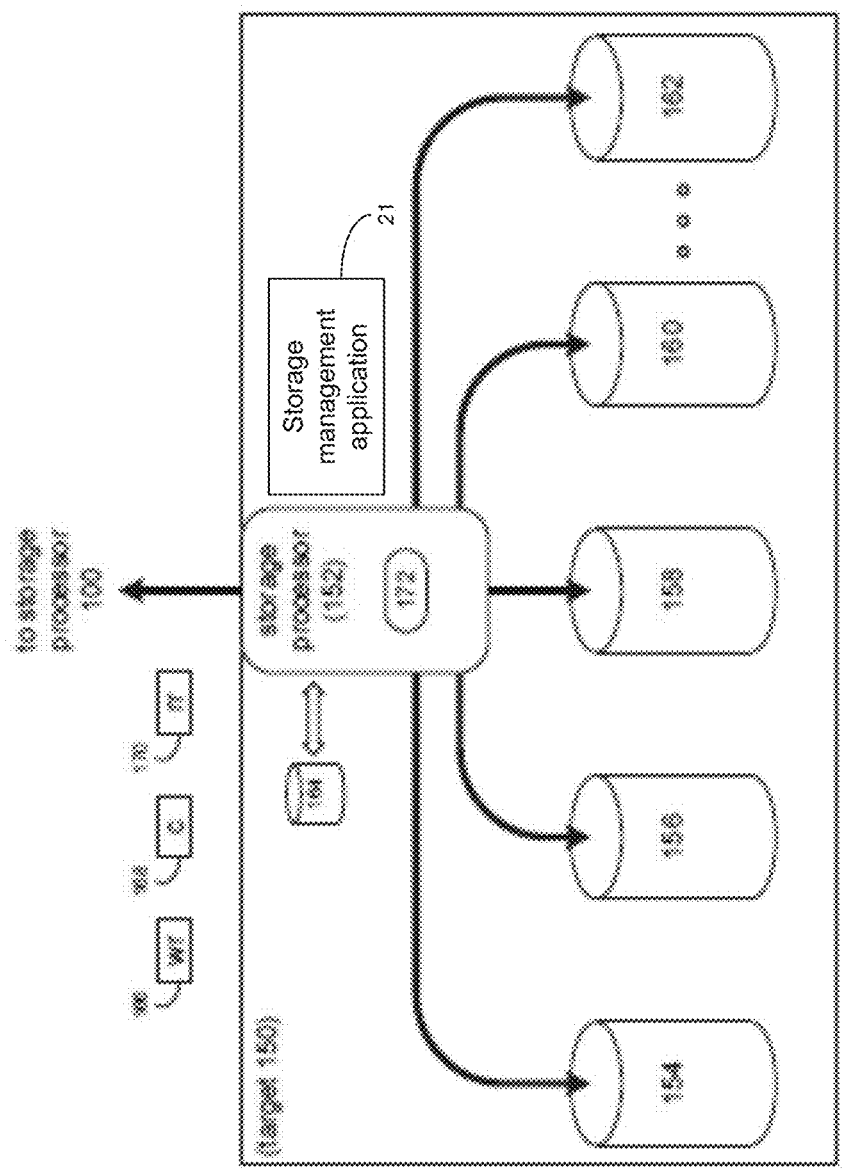
FIG. 3 is an example diagrammatic view of a storage target of FIG. 2 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or feedback process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Figure 4:
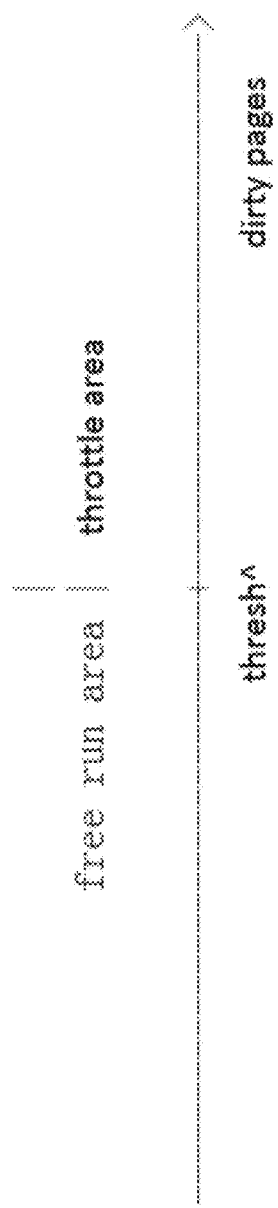
FIG. 4 is an example diagrammatic view of a general throttling process.
Figure 5:
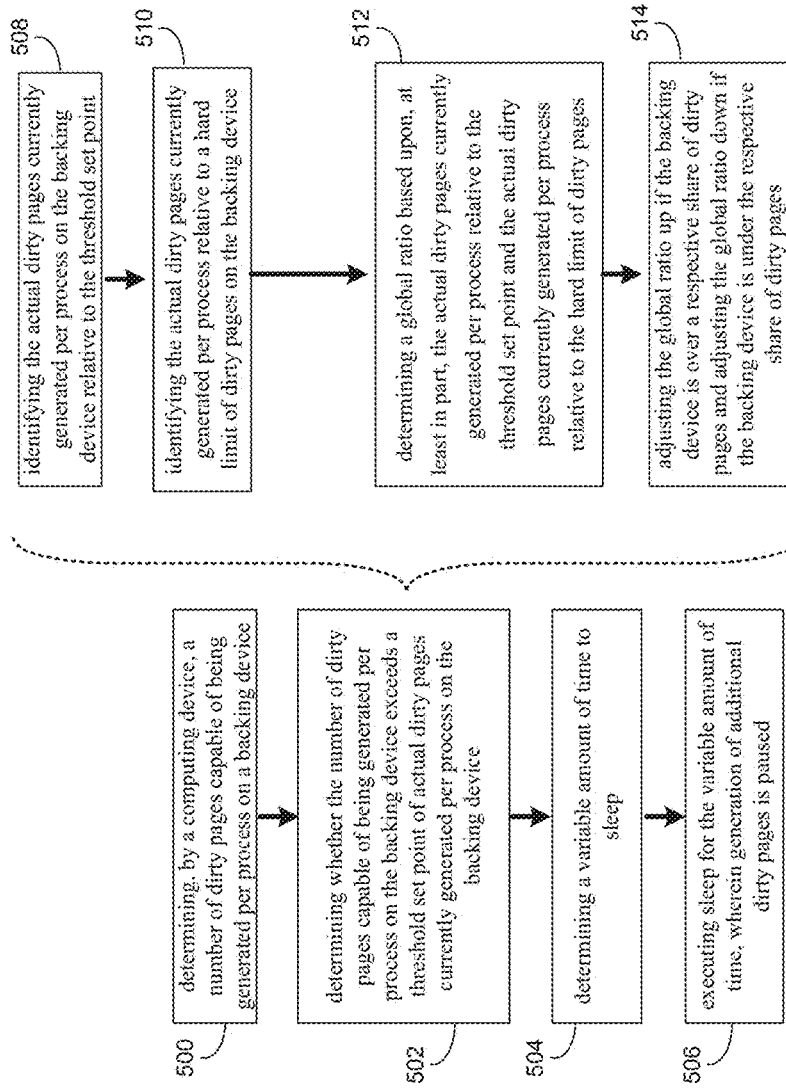
FIG. 5 is an example flowchart of a feedback process according to one or more example implementations of the disclosure.

Referring also to the example implementation of FIG. 4, there is shown a general approach to relieving I/O pressure. "Write back" may generally be described as the process of writing dirty pages back to persistent storage, allowing those pages to be reclaimed for other uses. When I/O pressure is too large, techniques to remedy this pressure may be implemented. For instance, a file system (e.g., a VNX™ system offered by Dell EMC™ of Hopkinton, Mass.) may use a threshold control flush method. With this example method, when the dirty pages exceed the threshold, cache data may be flushed to persistent data storage until the dirty page ratio is below the threshold. Under large I/O pressure, for example, if the application write data speed exceeds the system cache flush speed, the system may sleep, thereby blocking subsequent write operations until the dirty page ratio is below a specific threshold. In the example, sleeping until the dirty pages are below a specific threshold may generally be described as a throttling technique, where once a certain number of pages has been cleaned, the application may be allowed to continue to generate dirty pages. This may result in, e.g., write performance fluctuation, I/O write latency (e.g., with peak write latency reaching several seconds high). Such high write latency and performance fluctuation (e.g., "bumpy" I/Os) may not be acceptable to response time sensitive applications (e.g., bank transactions, etc.). As will be discussed in greater detail below, the present disclosure may allow for write I/O performance more smoothly solving bumpy I/O issues under large I/O pressure. It will be appreciated that the present disclosure may be used at any time (e.g., without the presence of large I/O pressure) without departing from the scope of the disclosure As will be discussed below, feedback process 10 may at least help, e.g., improvement data storage technology, necessarily rooted in computer technology in order to overcome an example and non-limiting problem specifically arising in the realm of file systems associated with, e.g., relieving high I/O pressure.

The Feedback Process:

As discussed above and referring also at least to the example implementations of FIGS. 5-10, feedback process 10 may determine 300, by a computing device, a number of dirty pages capable of being generated per process on a backing device. Feedback process 10 may determine 302 whether the number of dirty pages capable of being generated per process on the backing device exceeds a threshold set point of actual dirty pages currently generated per process on the backing device. Feedback process 10 may determine 304 a variable amount of time to sleep. Feedback process 10 may execute 306 sleep for the variable amount of time, wherein generation of additional dirty pages is paused.

In some implementations, "writeback" may generally be described as the process of writing dirty pages back to persistent storage, allowing those pages to be reclaimed for other uses. If the writeback is out of control, the system may be stuck or deadlocked. As will be discussed below, feedback process 10 may control the feedback mechanism to determine how many dirty pages each process can make at any given time. If the limit is exceeded, the system may will sleep for a variable time, allowing the feedback process 10 to keep up with the speed of making dirty pages. Thus, as will be discussed below, feedback process 10 may help maintain dirty pages at a suitable range, maximizing backend storage device usage, and control writes more smoothly without imposing unreasonable delays.

For example, in some implementations, feedback process 10 may determine 500, by a computing device, a number of dirty pages capable of being generated per process on a backing device. For instance, feedback process 10 may provide a control feedback cache flush technique, that may determine 500 how many dirty pages may be made per process in any time. In some implementations, feedback process 10 may make such a determination 500 according the current dirty pages numbers. For instance, in an ideal world, throttling would match the rate at which pages are being dirtied to the rate that each device (e.g., BDI) can write those pages back. A process dirtying pages backed by a fast SSD (for example) may be able to dirty more pages more quickly than a process writing to pages backed by a cheap thumb drive (for example). The idea being: if N processes are dirtying pages on a BDI with a given bandwidth, each process should be throttled to the extent that it dirties 1/N of that bandwidth. The issue may be that processes do not generally register with the kernel and declare that they intend to dirty lots of pages on a given BDI, so the kernel does not really know the value of N. That is handled by feedback process 10 carrying a running estimate of N. An initial per-task bandwidth limit may be established, and after a period of time, the kernel (e.g., via feedback process 10) may look at the number of pages actually dirtied for a given BDI and divide it by that bandwidth limit to come up with the number of active processes. From that estimate, a new rate limit may be applied, and in some implementations, this determination may be repeated over time.

Figure 6:
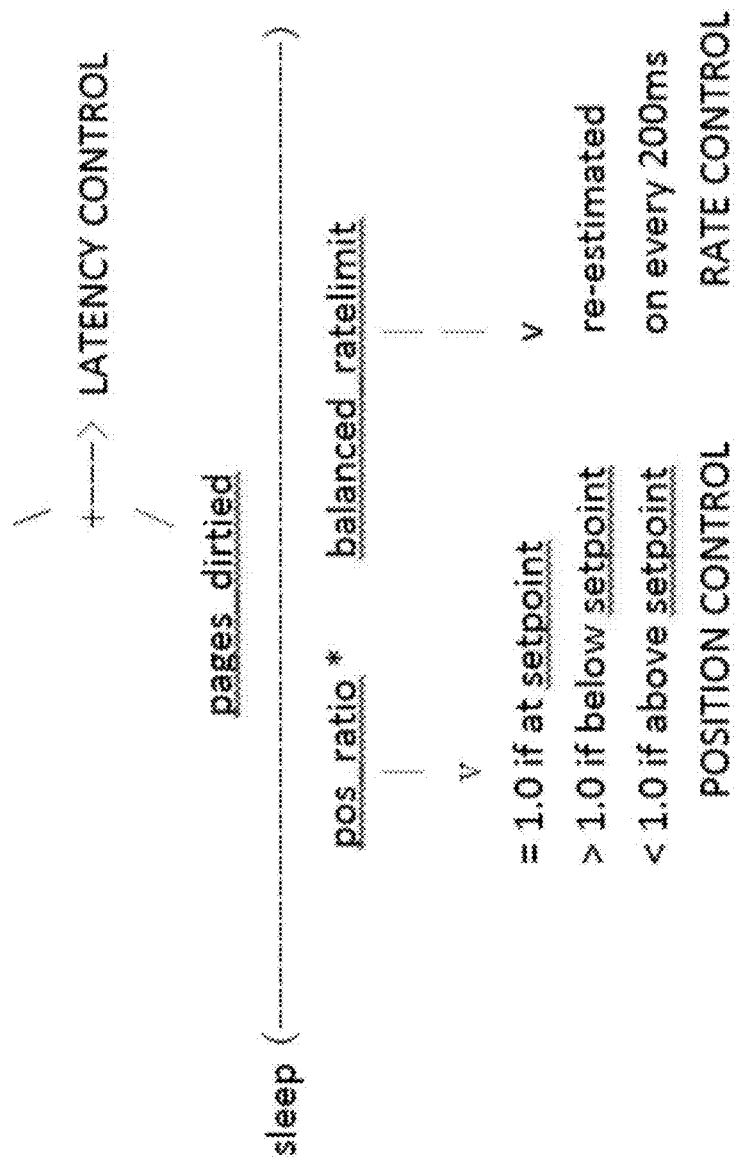
FIG. 6 is an example diagrammatic view of a technique for when enough pages have been dirtied during a write call process according to one or more example implementations of the disclosure.
Figure 7:
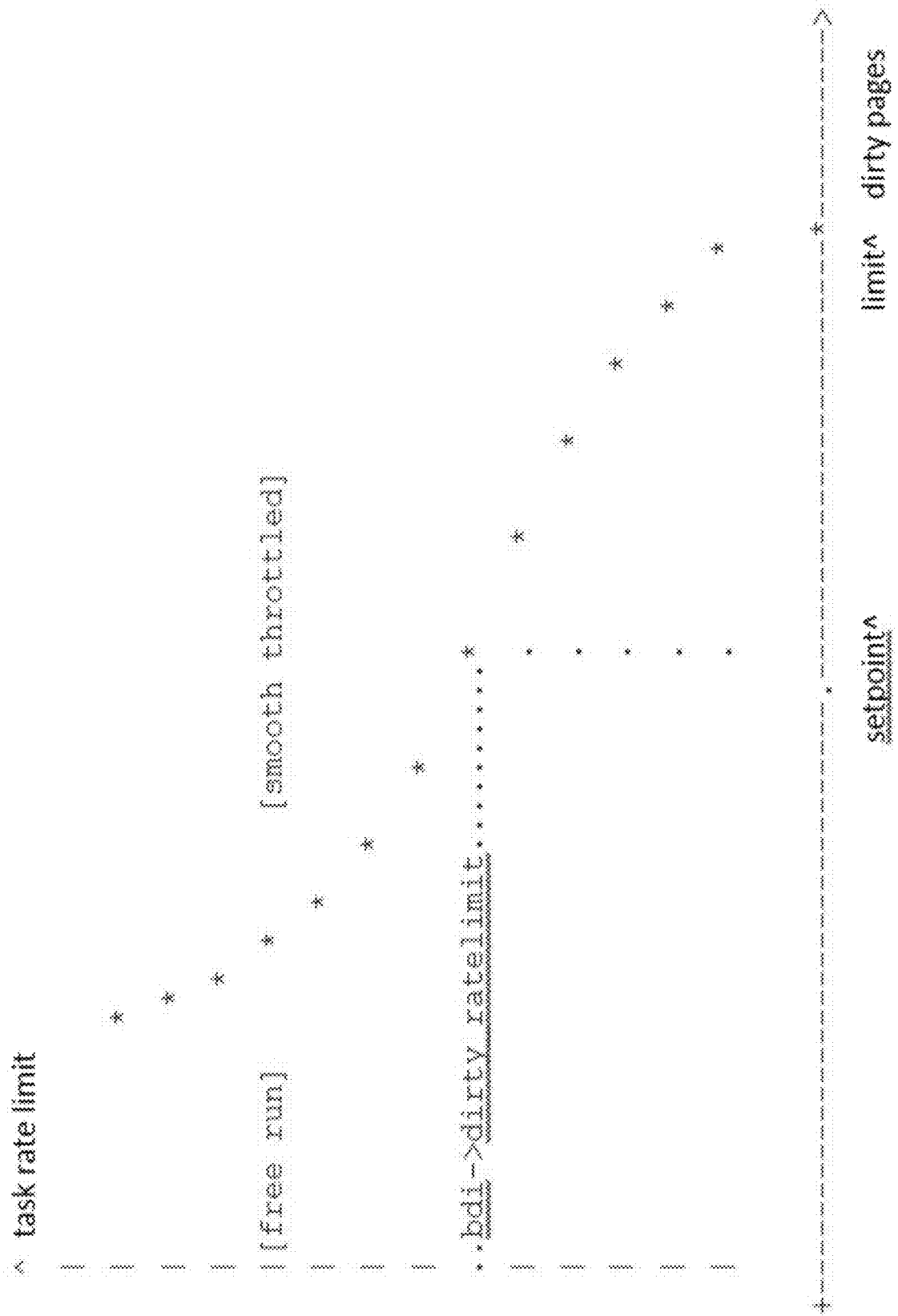
FIG. 7 is an example diagrammatic view of a smooth throttle technique for when enough pages have been dirtied during a write call process according to one or more example implementations of the disclosure.
Figure 8:
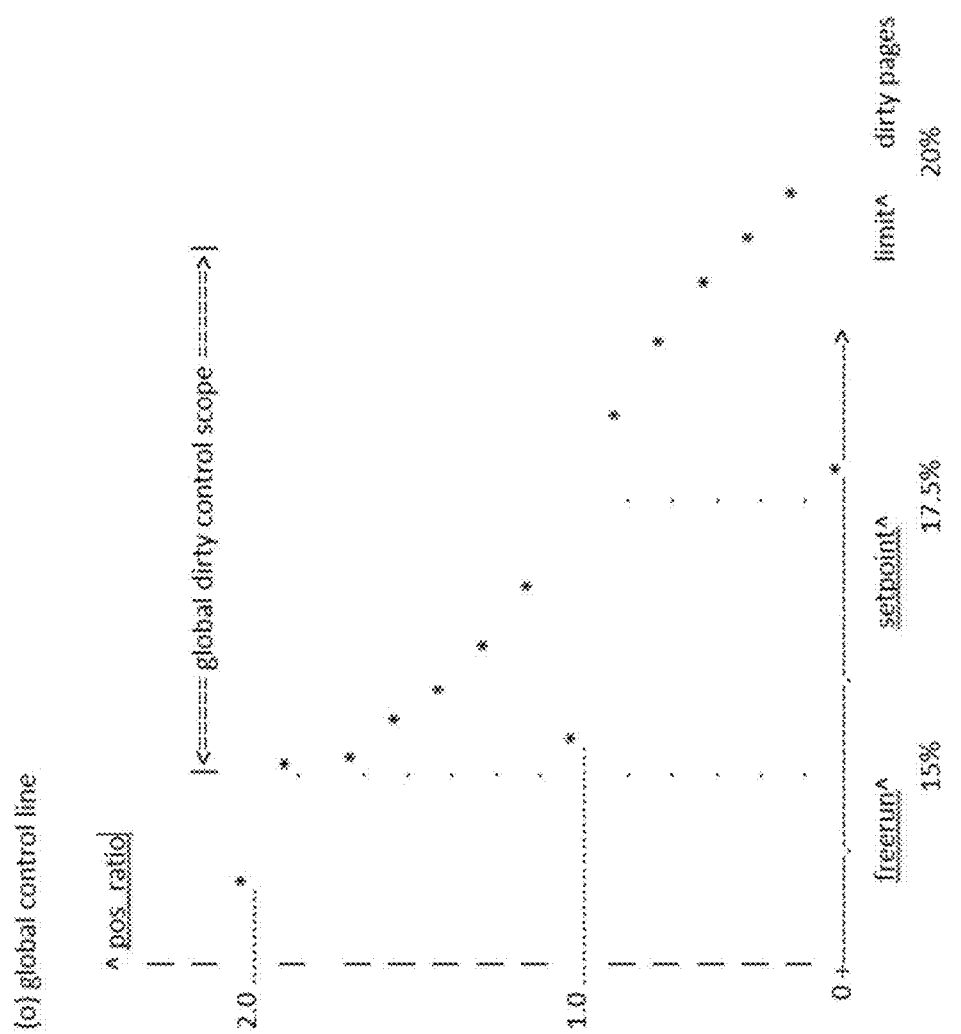
FIG. 8 is an example diagrammatic view of global control line according to one or more example implementations of the disclosure.

Feedback process 10 may determine 502 whether the number of dirty pages capable of being generated per process on the backing device exceeds a threshold set point of actual dirty pages currently generated per process on the backing device. For instance, and referring at least to the example in FIG. 6, a technique is shown to determine 502 when enough pages have been dirtied during a write call and whether the number of dirty pages capable of being generated per process on the backing device exceeds the threshold set point of actual dirty pages currently generated per process on the backing device. FIG. 6 may be used to control sleep time. Pages_dirties may be the current dirty page number, and Pos ratio may be calculated by the formula. The threshold set point may be the average of the flush threshold and the stop application write threshold. For example, if the dirty pages reach 40%, feedback process 10 may start the flush thread. When the dirty pages reach 80%, feedback process 10 may pause the application write I/O. In the example, the set point is the (40%+80%)/2=60%.

In some implementations, determining 502 whether the number of dirty pages capable of being generated per process exceeds the threshold set point of the actual dirty pages being generated per process on the backing device may include identifying 508 the actual dirty pages currently generated per process on the backing device relative to the threshold set point, and may further include identifying 510 the actual dirty pages currently generated per process relative to a hard limit of dirty pages on the backing device. For example, if the set point is 60%, and the limit is 80%, if the current dirty page is 65%, feedback process 10 may generate 100 dirty pages. When the dirty pages reach 70%, feedback process 10 may only generate 40 dirty. When the dirty pages reach 75%, feedback process 10 may only generate 5 dirty. The numbers of making dirty pages may be controlled by the sleep time, and the sleep time may be controlled by the pos_ratio, which is calculated by set point and the current dirty number.

In some implementations, determining 502 whether the number of dirty pages capable of being generated per process exceeds the threshold set point of the actual dirty pages being generated per process on the backing device may further include determining 512 a global ratio based upon, at least in part, the actual dirty pages currently generated per process relative to the threshold set point and the actual dirty pages currently generated per process relative to the hard limit of dirty pages. For instance, feedback process 10 may include a global memory pressure prediction algorithm, where when the memory usage pressure is large, the memory pressure estimation may increase, when the memory usage pressure is small, the memory pressure estimation may decrease. This pressure value may be used to adjust the throttling threshold for each application. When the system is under high memory usage, the process of making dirty pages may be more quickly blocked.

For instance, an example goal of feedback process 10 may be to keep the number of dirty pages at the set point, and if things get out of line, increase the amount of force that may be applied to bring things back to where they should be (e.g., below the threshold set point). That is, when there are too many dirty pages, sleep time may be longer, making the value go back to set point.

Thus, feedback process 10 may determine the current status of the system, which may be accomplished by example as follows: look at the global situation (e.g., how many dirty pages are there in the system relative to the set point and to the hard limit that the system does not ever want to exceed. For example, and referring at least to the example implementation of FIG. 7, feedback process 10 may use a cubic polynomial function to determine 512 a global "pos_ratio" to describe how strongly feedback process 10 needs to adjust the number of dirty pages.

Generally, the global ratio may be determined 512 by taking the backing device (BDI) into account. For instance, a process may be dirtying pages stored on a given BDI, and the system may have a surplus of dirty pages at the moment, but the wisdom of throttling that process may depend also on how many dirty pages exist for that BDI. For instance, if a given BDI is swamped with dirty pages, it may make sense for feedback process 10 to throttle a dirtying process even if the system as a whole is doing OK. On the other hand, a BDI with few dirty pages may clear its backlog quickly, so it may likely afford to have a few more dirty pages, even if the system is somewhat more dirty than one might like.

In some implementations, the global ratio may be adjusted 514 up if the backing device is over a respective share of dirty pages and the global ratio may be adjusted 514 down if the backing device is under the respective share of dirty pages. For instance, and referring at least to the example implementation of FIG. 8 and FIG. 9, it may be desirable for feedback process 10 to have the dirty pages be balanced around the global/bdi set points. When the number of dirty pages is higher/lower than the set point, the dirty position control ratio (and hence task dirty rate limit) may be adjusted 514 (e.g., increased or decreased) to bring the dirty pages back to the set point. For instance:

```
pos_ratio = 1 << RATELIMIT_CALC_SHIFT
    if (dirty < setpoint) scale up pos_ratio
    if (dirty > setpoint) scale down pos_ratio
    if (bdi_dirty < bdi_setpoint) scale up pos_ratio
    if (bdi_dirty > bdi_setpoint) scale down pos_ratio
    task_ratelimit = dirty_ratelimit * pos_ratio >>
    RATELIMIT_CALC_SHIFT
```

Figure 9:
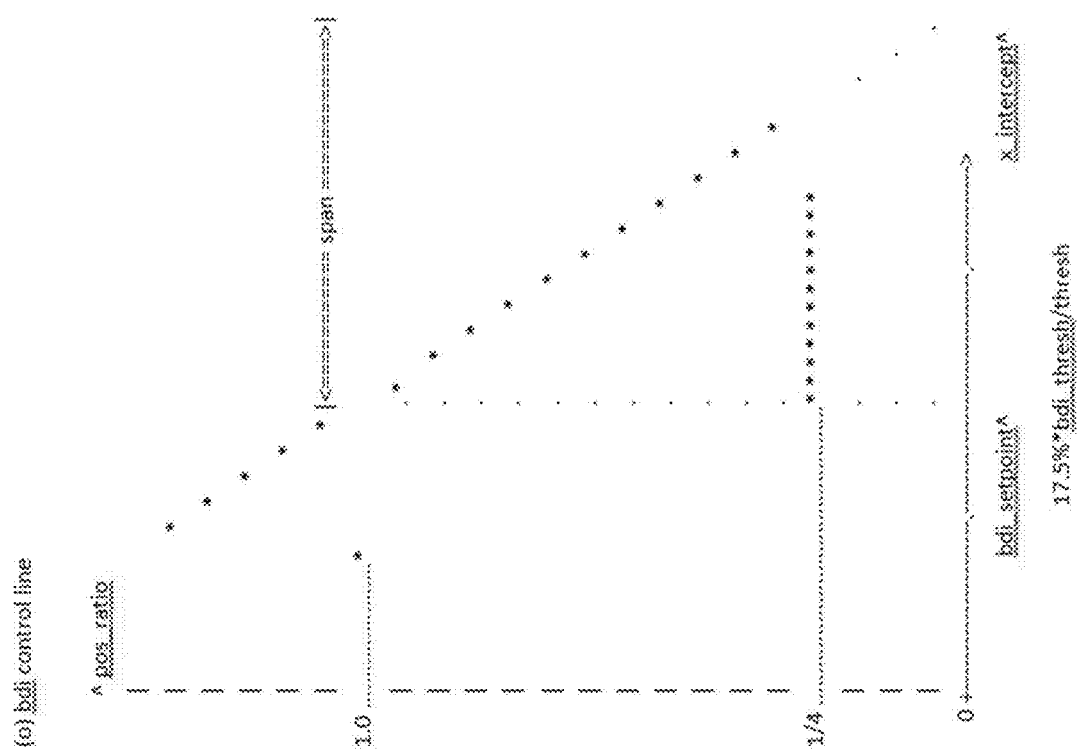
FIG. 9 is an example diagrammatic view of a BDI control line according to one or more example implementations of the disclosure.

As can be seen at least from FIG. 9, feedback process 10 may not allow the BDI control line to drop below pos_ratio=1/4, so that bdi_dirty may be smoothly throttled down to normal if it starts high (e.g., in situations like starting to write to a slow SD card and a fast disk at the same time). In the example, the SD card's bdi_dirty may rush to many times higher than the bdi_setpoint.

In some implementations, the BDI dirty threshold may drops quickly, e.g., due to change of JBOD ("Just a Bunch of Disks") workload. For example:

Global Set Point:

$$rty) := 1.0 + \left(\frac{setpoint - dirty}{limit - setpoint}\right)3$$

In the example, the above is a 3rd order polynomial that is subject to:

```
(1) f(freerun) = 2.0 => rampup dirty_ratelimit reasonably fast
(2) f(setpoint) = 1.0 => the balance point
(3) f(limit)   = 0 => the hard limit
(4) df/dx    <= 0 => negative feedback control
(5) the closer to setpoint, the smaller |df/dx| (and the reverse)
    => fast response on large errors; small oscillation near setpoint
setpoint = (freerun + limit) / 2;
x = div_s64((setpoint - dirty) << RATELIMIT_CALC_SHIFT,
        limit - setpoint + 1);
pos_ratio = x;
pos_ratio = pos_ratio * x >> RATELIMIT_CALC_SHIFT;
pos_ratio = pos_ratio * x >> RATELIMIT_CALC_SHIFT;
pos_ratio += 1 << RATELIMIT_CALC_SHIFT;
```

Thus, feedback process 10 may determine 512 the basic pos ratio above based on the global situation. In the example, if the BDI is over/under its share of dirty pages, feedback process 10 may adjust 514 to scale pos_ratio further down/up, which may be accomplished using the following example mechanism:

*BDI* Set Point $$f(\text{bdi\_dirty}) :=$$

$$1.0 + k*(\text{bdi\_dirty} - \text{bdi\_setpoint}) := \frac{\text{x\_intercept} - \text{bdi\_dirty}}{\text{x\_intercept} - \text{bdi\_setpoint}}$$

In some implementations, the main BDI control line may be a linear function that may be subject to:

(1) f(bdi_setpoint) = 1.0
(2) k =− 1 / (8 * write_bw) (in single bdi case)
  or equally: x_intercept = bdi_setpoint + 8 * write_bw In some implementations, for a single BDI example, the dirty pages may be observed to fluctuate regularly within range:

[bdi_setpoint−write_bw/2, bdi_setpoint+write_bw/2]

where for various file systems, where (2) can yield in a reasonable example 12.5% fluctuation range for the pos_ratio.

For the above-noted JBOD example, bdi_thresh (not bdi_dirty) may fluctuate up to its own size, so the slope may be moved over accordingly and feedback process 10 may choose a slope that may yields 100% pos_ratio fluctuation on a suddenly doubled bdi_thresh.

if (unlikely(bdi_thresh>thresh))
  bdi_thresh=thresh;

In some implementations, it may be possible that bdi_thresh is close to 0, not necessarily because the BDI is slow, but rather that it may have remained inactive for a long time. Having such devices with a reasonably good (hopefully I/O efficient) threshold, may enable the occasional writes not to be blocked and active, and writes may ramp up the threshold quickly. For example:

bdi_thresh = max(bdi_thresh, (limit − dirty) / 8);
  scale global setpoint to bdi's:
    bdi_setpoint = setpoint * bdi_thresh / thresh
x = div_u64((u64)bdi_thresh << 16, thresh + 1);
bdi_setpoint = setpoint * (u64)x >> 16;
  Use span=(8*write_bw) in single bdi case as indicated by
  (thresh − bdi_thresh ~= 0) and transit to bdi_thresh in JBOD case.

$$\text{span} = \frac{\text{bdi\_thresh}}{\text{thresh}} * (8*\text{write\_bw}) + \frac{\text{thresh} - \text{bdi\_thresh}}{\text{thresh}} * \text{bdi\_thresh}$$

$$= \frac{\text{bdi\_thresh}}{\text{thresh}} * (8*\text{write\_bw} + \text{thresh} - \text{bdi\_thresh})$$

span = (thresh − bdi_thresh + 8 * write_bw) * (u64)x >> 16;
x_intercept = bdi_setpoint + span;
  span = x_intercept − bdi_setpoint
  k = df/dx = −1 /span
  if (bdi_dirty < x_intercept − span / 4) {
    pos_ratio = div_u64(pos_ratio * (x_intercept − bdi_dirty),
      x_intercept − bdi_setpoint + 1);
  } else
    pos_ratio /= 4
}

In some implementations, feedback process 10 may determine 504 a variable amount of time to sleep, and in some implementations, the variable amount of time to sleep may be dynamically determined 504 based upon, at least in part, a write back bandwidth capability of the backing device and a dynamic water level regulation of the number of dirty pages capable of being generated per process. For example, in some implementations, the sleep time may be dynamically determined by the backend write back device's bandwidth capability and the current dirty page water level line. For instance, assume for example purposes only that there are two back-end devices, e.g., one is SDD, one is HDD. The slower the device performance, the flatter the control line. The faster the device performance, the steeper the control line, because the slower device needs to slowly change to prevent excessive fluctuations.

In some implementations, feedback process 10 may execute 506 sleep for the variable amount of time, wherein generation of additional dirty pages is paused. For example, if the number of dirty pages exceed the above-noted limit, feedback process 10 may cause the BDI to sleep for a variable amount of time determined by the backend write back device's bandwidth capability and the current dirty page water level line (as opposed to a fixed time based upon a simple threshold of dirty pages like with other throttling processes), and may let the system to keep up with the speed of making dirty pages. As such, feedback process 10 may increase the control algorithm sleep time in a write system call, not simply for a fixed sleep time, but for a reasonable sleep time that is determined by the write back device write back bandwidth capability and the dynamic water level regulation of dirty pages.

Figure 10:
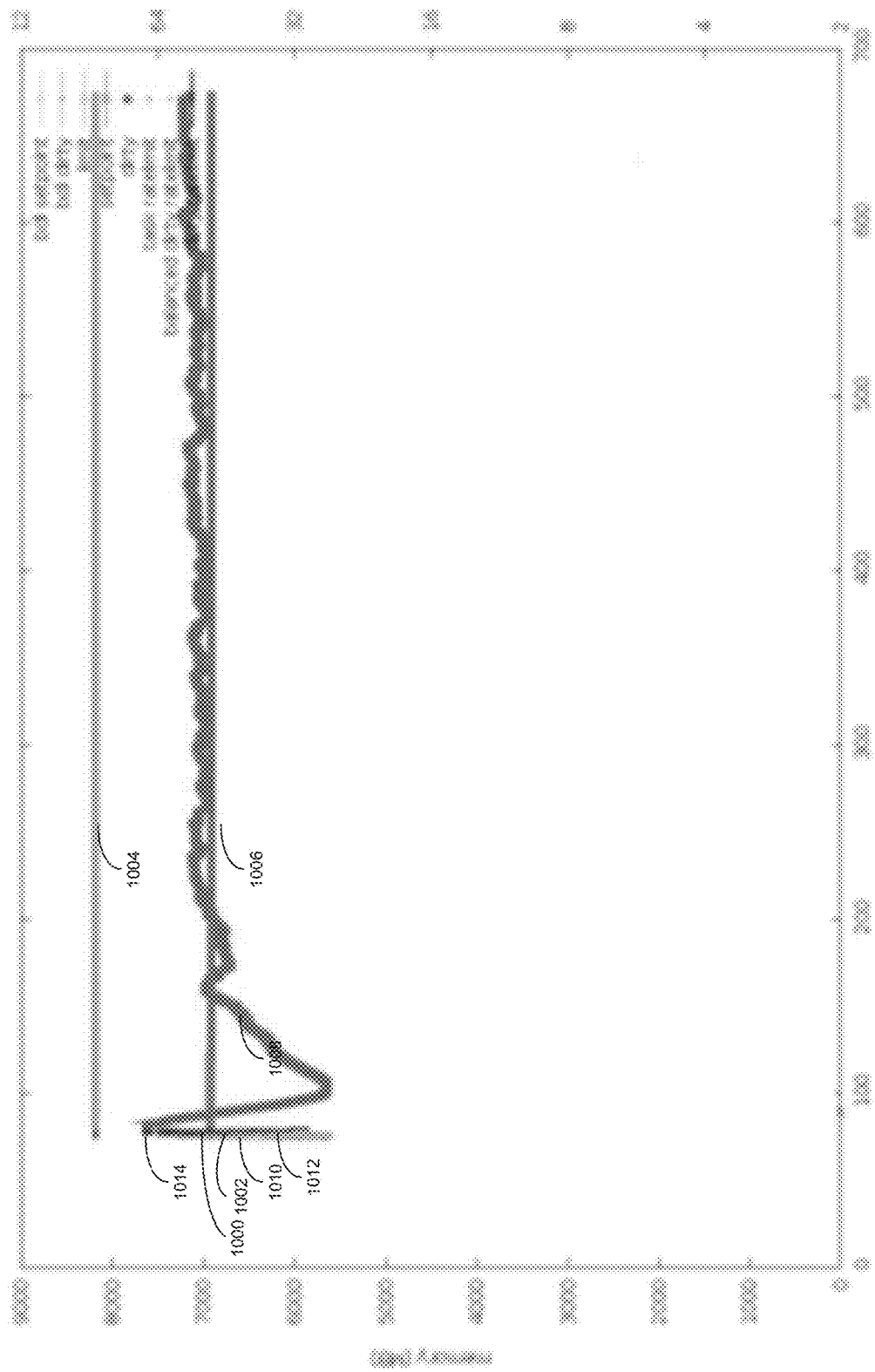
FIG. 10 is an example graph showing results of feedback process 10 according to one or more example implementations of the disclosure.

In some implementations, and referring at least to the example results shown in FIG. 10, feedback process 10 may help maintain dirty pages at a suitable range, maximizing backend storage device usage, and control writes more smoothly without imposing unreasonable delays. As seen in FIG. 10, there is example performance results of implementing feedback process 10. As shown, there is BDI set point 1000, BDI dirty 1002, limit 1004, set point 1006, dirty 1008, task rate limit 1010, balanced dirty rate limit 1012, and dirty rate limit 1014.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   determining, by a computing device, a number of dirty pages capable of being generated per process on a backing device;
   determining whether the number of dirty pages capable of being generated per process on the backing device exceeds a threshold set point of actual dirty pages currently generated per process on the backing device;
   determining a variable amount of time to sleep if the number of dirty pages capable of being generated per process on the backing device exceeds the threshold set point of actual dirty pages currently generated per process on the backing device; and
   executing sleep for the variable amount of time, wherein generation of additional dirty pages is paused.

2. The computer-implemented method of claim 1 wherein determining whether the number of dirty pages capable of being generated per process exceeds the threshold set point of the actual dirty pages being generated per process on the backing device includes identifying the actual dirty pages currently generated per process on the backing device relative to the threshold set point.

3. The computer-implemented method of claim 2 wherein determining whether the number of dirty pages capable of being generated per process exceeds the threshold set point of the actual dirty pages being generated per process on the backing device further includes identifying the actual dirty pages currently generated per process relative to a hard limit of dirty pages on the backing device.

4. The computer-implemented method of claim 3 wherein determining whether the number of dirty pages capable of being generated per process exceeds the threshold set point of actual dirty pages being generated per process on the backing device further includes determining a global ratio based upon, at least in part, the actual dirty pages currently generated per process relative to the threshold set point and the actual dirty pages currently generated per process relative to the hard limit of dirty pages.

5. The computer-implemented method of claim 4 further comprising adjusting the global ratio up if the backing device is over a respective share of dirty pages and adjusting the global ratio down if the backing device is under the respective share of dirty pages.

6. The computer-implemented method of claim 1 wherein the variable amount of time to sleep is determined dynamically.

7. The computer-implemented method of claim 1 wherein the variable amount of time to sleep is determined based upon, at least in part, a write back bandwidth capability of the backing device and a dynamic water level regulation of the number of dirty pages capable of being generated per process.

8. A computer program product residing on a computer readable storage medium having a plurality of instructions stored thereon which, when executed across one or more processors, causes at least a portion of the one or more processors to perform operations comprising:
   determining a number of dirty pages capable of being generated per process on a backing device;
   determining whether the number of dirty pages capable of being generated per process on the backing device exceeds a threshold set point of actual dirty pages currently generated per process on the backing device;
   determining a variable amount of time to sleep if the number of dirty pages capable of being generated per process on the backing device exceeds the threshold set point of actual dirty pages currently generated per process on the backing device; and
   executing sleep for the variable amount of time, wherein generation of additional dirty pages is paused.

9. The computer program product of claim 8 wherein determining whether the number of dirty pages capable of being generated per process exceeds the threshold set point of the actual dirty pages being generated per process on the backing device includes identifying the actual dirty pages currently generated per process on the backing device relative to the threshold set point.

10. The computer program product of claim 9 wherein determining whether the number of dirty pages capable of being generated per process exceeds the threshold set point of the actual dirty pages being generated per process on the backing device further includes identifying the actual dirty pages currently generated per process relative to a hard limit of dirty pages on the backing device.

11. The computer program product of claim 10 wherein determining whether the number of dirty pages capable of being generated per process exceeds the threshold set point of the actual dirty pages being generated per process on the backing device further includes determining a global ratio based upon, at least in part, the actual dirty pages currently generated per process relative to the threshold set point and the actual dirty pages currently generated per process relative to the hard limit of dirty pages.

12. The computer program product of claim 11 wherein the operations further comprise adjusting the global ratio up if the backing device is over a respective share of dirty pages and adjusting the global ratio down if the backing device is under the respective share of dirty pages.

13. The computer program product of claim 8 wherein the variable amount of time to sleep is determined dynamically.

14. The computer program product of claim 8 wherein the variable amount of time to sleep is determined based upon, at least in part, a write back bandwidth capability of the backing device and a dynamic water level regulation of the number of dirty pages capable of being generated per process.

15. A computing system including one or more processors and one or more memories configured to perform operations comprising:
  determining a number of dirty pages capable of being generated per process on a backing device;
  determining whether the number of dirty pages capable of being generated per process on the backing device exceeds a threshold set point of actual dirty pages currently generated per process on the backing device;
  determining a variable amount of time to sleep if the number of dirty pages capable of being generated per process on the backing device exceeds the threshold set point of actual dirty pages currently generated per process on the backing device; and
  executing sleep for the variable amount of time, wherein generation of additional dirty pages is paused.

16. The computing system of claim 15 wherein determining whether the number of dirty pages capable of being generated per process exceeds the threshold set point of the actual dirty pages being generated per process on the backing device includes identifying the actual dirty pages currently generated per process on the backing device relative to the threshold set point.

17. The computing system of claim 16 wherein determining whether the number of dirty pages capable of being generated per process exceeds the threshold set point of the actual dirty pages being generated per process on the backing device further includes identifying the actual dirty pages currently generated per process relative to a hard limit of dirty pages on the backing device.

18. The computing system of claim 17 wherein determining whether the number of dirty pages capable of being generated per process exceeds the threshold set point of the actual dirty pages being generated per process on the backing device further includes determining a global ratio based upon, at least in part, the actual dirty pages currently generated per process relative to the threshold set point and the actual dirty pages currently generated per process relative to the hard limit of dirty pages.

19. The computing system of claim 18 wherein the operations further comprise adjusting the global ratio up if the backing device is over a respective share of dirty pages and adjusting the global ratio down if the backing device is under the respective share of dirty pages.

20. The computing system of claim 15 wherein the variable amount of time to sleep is determined dynamically.

* * * * *